United States Patent
Tadokoro

(10) Patent No.: US 6,948,241 B2
(45) Date of Patent: Sep. 27, 2005

(54) CORRUGATED TUBE-MOUNTING STRUCTURE

(75) Inventor: Shinichi Tadokoro, Susono (JP)

(73) Assignee: Yazaki Corporation, Tokyo (JP)

(*) Notice: Subject to any disclaimer, the term of this patent is extended or adjusted under 35 U.S.C. 154(b) by 547 days.

(21) Appl. No.: 10/172,952

(22) Filed: Jun. 18, 2002

(65) Prior Publication Data

US 2002/0194732 A1 Dec. 26, 2002

(30) Foreign Application Priority Data

Jun. 22, 2001 (JP) ........................................ P2001-190071

(51) Int. Cl.$^7$ ............................................. H01R 43/00
(52) U.S. Cl. ........................... 29/872; 29/868; 29/33 F; 174/68.3; 174/102 D; 285/149.1; 285/154.1; 285/154.3; 285/903
(58) Field of Search ........................ 29/868, 872, 33 F; 174/68.3, 102 D; 285/149.1, 154.1, 154.3, 903

(56) References Cited

U.S. PATENT DOCUMENTS

| | | | | |
|---|---|---|---|---|
| 4,248,459 A | * | 2/1981 | Pate et al. ................... | 285/319 |
| 4,251,094 A | * | 2/1981 | Pinto ........................ | 285/382.5 |
| 5,160,811 A | | 11/1992 | Ritzmann | |
| 6,096,975 A | | 8/2000 | Streit | |
| 6,137,055 A | * | 10/2000 | Kawamura ................. | 174/68.3 |
| 6,317,968 B1 | * | 11/2001 | Kawamura ................... | 29/755 |

FOREIGN PATENT DOCUMENTS

JP 2000-134762 5/2000

OTHER PUBLICATIONS

Japanese Abstract No. 08308070, dated Nov. 22, 1996.

* cited by examiner

Primary Examiner—Rick Kiltae Chang
(74) Attorney, Agent, or Firm—Sughrue Mion, PLLC

(57) ABSTRACT

A corrugated tube includes a tubular body, formed with a slit extending in an axial direction of the tubular body; a plurality of ridge portions, formed on an outer periphery of the tubular body and arranged side by side in the axial direction; and a lap portion, protruded from one of opposed end portions of the tubular body which are separated by the slit and extended toward an inner face of the other opposed end portion of the tubular body. A plurality of fixation members are provided on the outer periphery of the tubular body to fix the corrugated tube onto the panel body in a state that the tubular body is so twisted that the slit is spirally extended.

3 Claims, 9 Drawing Sheets

CORRUGATED TUBE-MOUNTING STRUCTURE

BACKGROUND OF THE INVENTION

This invention relates to a structure of mounting a corrugated tube for fitting on a wire harness or the like, and more particularly to a structure of mounting a corrugated tube of the overlapping type in which a lap portion, formed in a projected manner at one of opposed side edges of a slit formed in the corrugated tube in an axial direction thereof, is laid on an inner face of the other side edge portion.

Generally, in a corrugated tube used for bundling and protecting electric wires for an electronic equipment, a wire harness for a vehicle or others, spiral or annular ridge portions are formed continuously on an outer peripheral face of a resin tube to form a bellows-like construction, thereby imparting flexibility to the corrugated tube.

In order that a wire harness or the like can be easily inserted into and removed from the corrugated tube for protecting the wire harness, a slit is formed in the corrugated tube, and extends in the axial direction thereof.

However, when such a corrugated tube is bent along an installation path, the slit is partially opened in the vicinity of a central portion of the bent portion, and the inserted wire harness or the like projects outwardly through the opened portion of the slit, thus adversely affecting the inserting operation, and besides there is a probability that the wire harness is caught by the opposed side edges of the slit, so that an insulating sheath of the wire harness is damaged. Therefore, usually, an adhesive tape is wound on the outer peripheral face of the corrugated tube, thereby preventing the slit from being opened. However, there has been encountered a problem that this taping operation requires much time and labor.

In order to solve the above problems with the corrugated tube, there have been proposed various corrugated tubes of the overlapping type in which a slit will not be opened to form an opened portion even when the corrugated tube is bent.

A corrugated tube 1 of the overlapping type, shown in FIGS. 9 and 10, comprises a tubular body 3 of an integrally-molded construction which includes a base plate 7 and a bellows-like portion 9 having a series of arcuate ridge portions 10 which are formed in a bulged manner on an outer peripheral face of the tubular body except the base plate 7, and are arranged side by side in the axial direction of the tubular body 3.

A straight slit is formed in the base plate 7 in the axial direction of the tubular body 3, so that a strip-like lap portion 8 is formed at one of opposed side edges of this slit in a projected manner. Thereafter, the tubular body 3 is formed by heat into such a shape that the lap portion 8 is laid on (laps on) the inner face of the other side edge portion of the slit, thereby forming the corrugated tube 1 of the overlapping type as shown in FIGS. 9 and 10.

In the corrugated tube 1, the lap portion 8, laid on the inner face of the other side edge portion of the slit, has a strip-like shape, and has a distal end edge extending straight in the axial direction.

Therefore, when inserting a wire harness W into the corrugated tube after expanding the slit, the wire harness W is less liable to be caught by the distal end edge of the lap portion 8, and the harness-inserting operation can be effected smoothly. And besides, there is no probability that the distal end edge of the lap portion 8, laid on the inner peripheral face of the corrugated tube 1, damages an insulating sheath of the inserted wire harness W.

As shown in FIG. 11, the corrugated tube 1 is fixed to a predetermined portion of the wire harness W by adhesive tapes T or the like wound respectively on opposite end portions of the corrugated tube, as shown in FIG. 11.

In this case, the corrugated tube 1 is so arranged that the wire harness W will not be exposed to an external view even when the corrugated tube is bent, and it is not necessary to wind the adhesive tape T on the outer peripheral face of the corrugated tube 1 over an entire area thereof.

As shown in FIG. 12, the corrugated tube 1, together with the wire harness W, is fixed to a vehicle body panel 15 of a vehicle, for example, by inserting clip portions 17a of band clips 17 (fastened on the outer peripheral face of the corrugated tube 1) respectively into mounting holes 16 in the vehicle body panel 15.

When installing the wire harness W, protected by the corrugated tube 1, on the vehicle body panel 15 or the like, the corrugated tube need to be bent along an installation path, as shown in FIG. 12.

In the above corrugated tube 1, however, the lap portion 8 is formed into a strip-like shape, and besides end walls 12 and 14 are formed respectively at peripheral ends of each ridge portion 10 opposed to each other with the slit lying therebetween.

Therefore, when bending the corrugated tube 1 along the installation path, the corrugated tube 1 itself can not be easily bent, and therefore there has been encountered a problem that the installation operation can be adversely affected.

Particularly when the corrugated tube 1 is bent in such a manner that the lap portion 8 is curved inwardly as shown in FIG. 12, the end walls 12 and 14 (which are parallel to the bending direction, and have high rigidity), exhibit high resiliency, and therefore the flexibility of the corrugated tube is not good. When this corrugated tube 1 is forcibly bent substantially, there are probabilities that the slit is opened in the vicinity of a central portion of the bent portion and that one of the opposed side edges of the slit is broken.

SUMMARY OF THE INVENTION

It is therefore an object of this invention to provide a corrugated tube-mounting structure in which a corrugated tube of the overlapping type can be easily bent along an installation path.

In order to achieve the above object, according to the present invention, there is provided a method of mounting a corrugated tube onto a panel body, comprising the steps of:

providing a corrugated tube, including:

a tubular body, formed with a slit extending in an axial direction of the tubular body;

a plurality of ridge portions, formed on an outer periphery of the tubular body and arranged side by side in the axial direction; and a lap portion, protruded from one of opposed end portions of the tubular body which are separated by the slit and extended toward an inner face of the other opposed end portion of the tubular body;

providing fixation members on the outer periphery of the tubular body;

twisting the tubular body such that the slit is spirally extended;

bending the twisted tubular body; and attaching the fixation members onto the panel body while the corrugated tube is bent.

In this method, those portions of the tubular body, disposed near to the lap portion, can disperse a bending stress, produced upon bending of the tubular body, in the axial direction and the peripheral direction over the outer peripheral face to relieve this bending stress, and therefore the corrugated tube can be easily bent along the installation path although the corrugated tube has the strip-like lap portion.

Preferably, the mounting method further comprising a step of fixing the twisted tubular body with electric wires inserted into the tubular body, before the bending step.

In this case, the tubular body is beforehand fixed to the electric wires, in such a manner that the tubular body is twisted about the axis thereof, and therefore when the tubular body, together with the electric wires, is to be installed on and fixed to the mounting portion, the corrugated tube can be easily bent in a desired direction.

Therefore, the operator can easily bend the corrugated tube in accordance with the installation path.

Preferably, each fixation member includes a clip member fixed on the panel body. Here, the respective clip members are oriented to different circumferential directions with respect to the tubular body, when the fixation members are provided. Then the tubular body is so twisted that the respective clip members are oriented to an identical circumferential direction.

In this case, when the corrugated tube is installed on and fixed to the mounting portion, the clip portions of the plurality of fixation members are fixed respectively to predetermined portions of the mounting portion, and by doing so, the tubular body, installed on the mounting portion, is twisted about the axis thereof.

When the tubular body is fixed with the electric wires passing therethrough, in such a manner that the slit of the tubular body is still straight with respect to the electric wires as well as the case with the related-art construction. Therefore the operation for fixing the tubular body to the electric wires can be effected easily.

According to the present invention, there is also provided a structure comprising:

a panel body;

a corrugated tube, including:

a tubular body, formed with a slit extending in an axial direction of the tubular body;

a plurality of ridge portions, formed on an outer periphery of the tubular body and arranged side by side in the axial direction; and a lap portion, protruded from one of opposed end portions of the tubular body which are separated by the slit and extended toward an inner face of the other opposed end portion of the tubular body; and a plurality of fixation members, provided on the outer periphery of the tubular body to fix the corrugated tube onto the panel body in a state that the tubular body is so twisted that the slit is spirally extended.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 9:
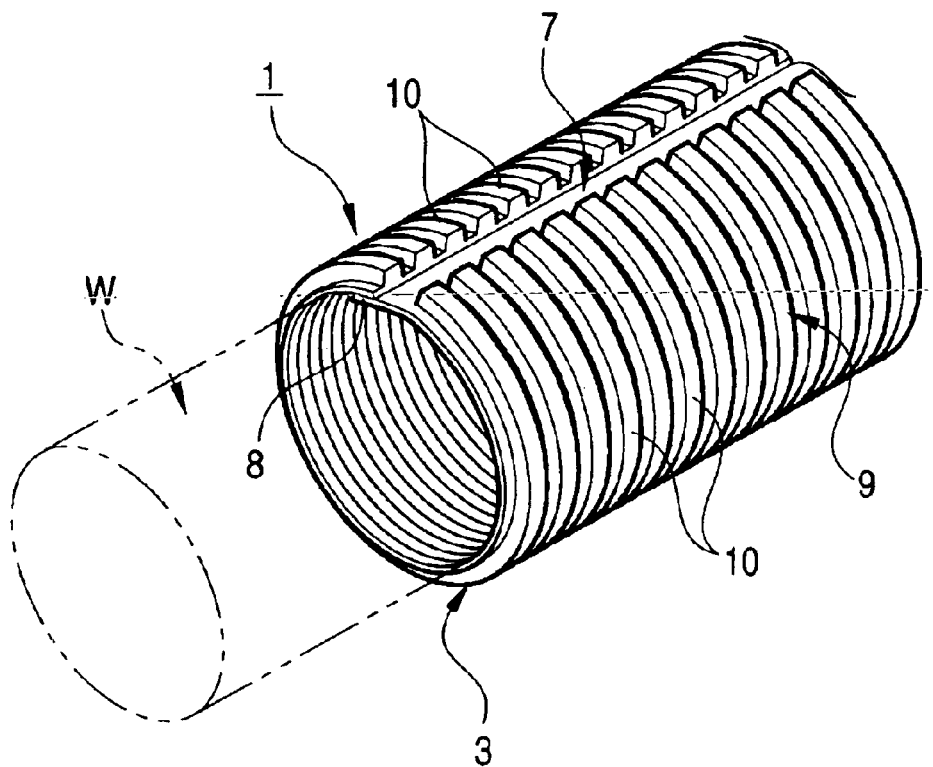
FIG. 9 is a fragmentary, perspective view showing a corrugated tube of the overlapping type.
Figure 10:
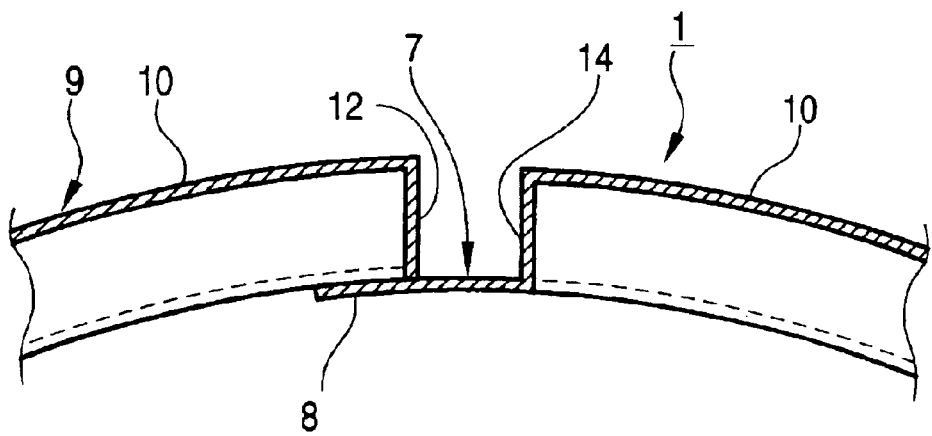
FIG. 10 is an enlarged, transverse cross-sectional view of an essential portion of the corrugated tube of FIG. 9.

Preferred embodiments of a corrugated tube-mounting structure of the present invention will now be described in detail with reference to the accompanying drawings. However, a corrugated tube itself in this embodiment is similar in construction to the corrugated tube 1 of the overlapping type shown in FIGS. 9 and 10, and therefore corresponding portions thereof will be designated by identical reference numerals, respectively, and detailed description thereof will be omitted.

Figure 1:
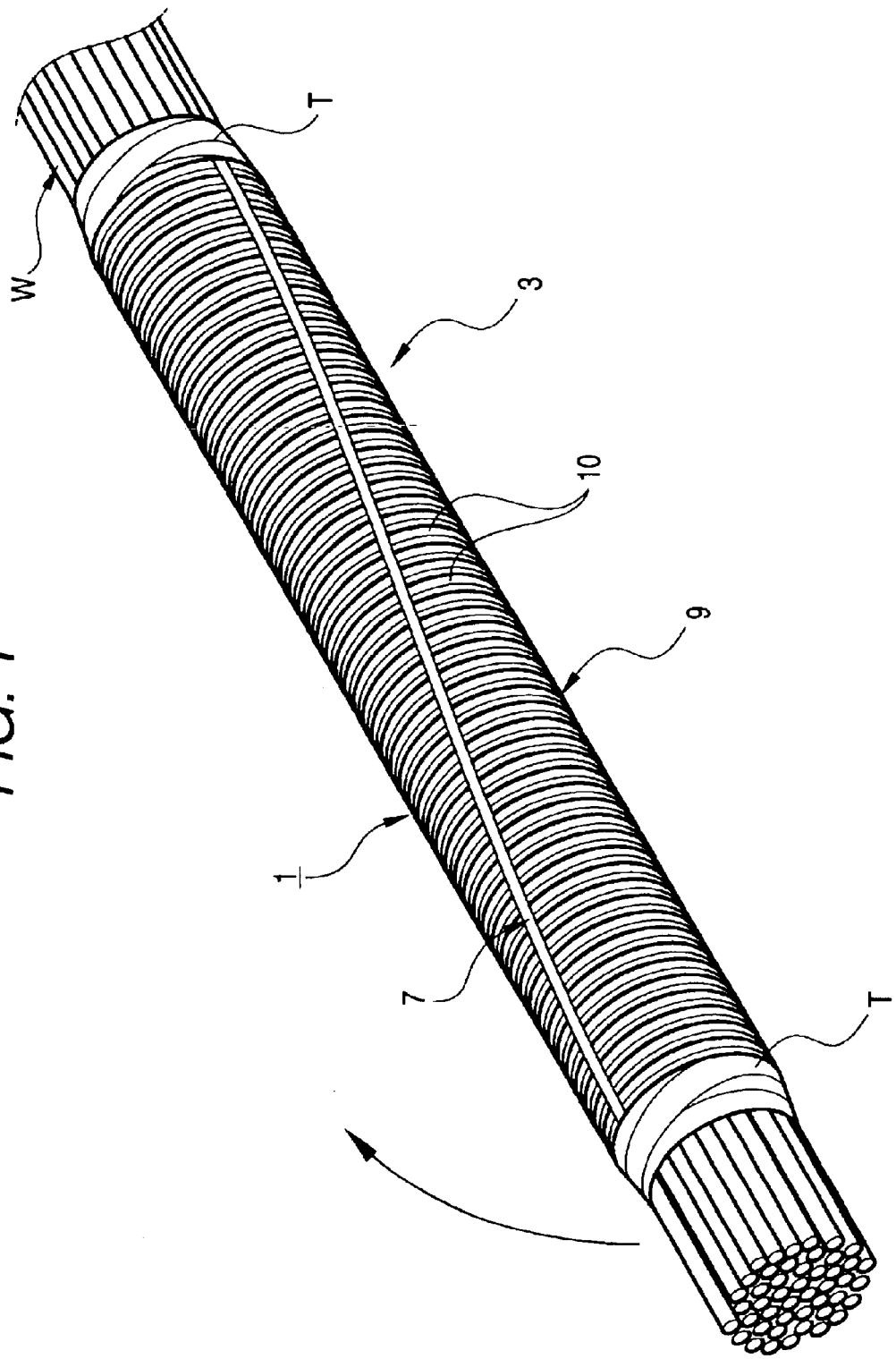
FIG. 1 is a perspective view of a corrugated tube-mounting structure according to a first embodiment of the present invention, showing a corrugated tube in a straight condition before it is mounted.

A corrugated tube 1, used in a mounting structure according to a first embodiment, is fixed to a predetermined portion of a wire harness W by adhesive tapes T or the like wound respectively on opposite end portions thereof, as shown in FIG. 1. At this time, a tubular body 3 is beforehand fixed to the wire harness W, passing therethrough, in such a manner that this tubular body 3 is twisted about an axis thereof relative to the wire harness W.

Namely, the tubular body 3 is twisted about the axis thereof, so that a lap portion 8 extends spirally along an outer peripheral face of the tubular body 3. In this embodiment, although the tubular body 3 is twisted about the axis thereof through an angle of about 90 degrees, this twisting angle can be suitably changed in accordance with the overall length of the tubular body 3 and so on.

Figure 2:
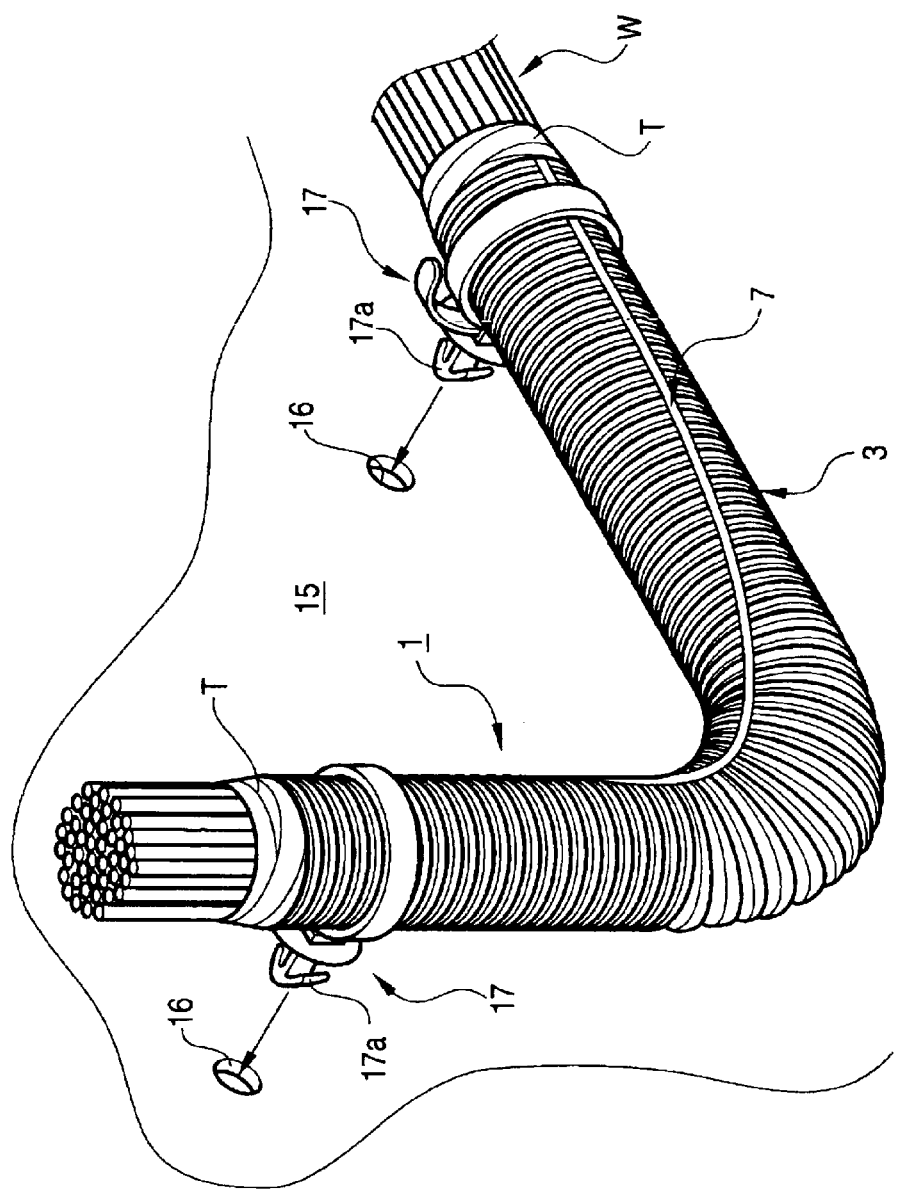
FIG. 2 is a perspective view of the corrugated tube-mounting structure of FIG. 1, showing the corrugated tube in a bent condition before it is mounted.

As shown in FIG. 2, the corrugated tube 1, together with the wire harness W, is fixed to a vehicle body panel 15 of a vehicle, for example, by inserting clip portions 17a of band clips (clamp members) 17 (fastened on the outer peripheral face of the corrugated tube 1) respectively into mounting holes 16 in the vehicle body panel 15.

At this time, the tubular body 3 is bent generally at right angles in accordance with a path of installation of the wire harness W. However, this tubular body is installed on and fixed to the vehicle body panel 15 in such a manner that the tubular body is twisted about the axis thereof, and those portions of the tubular body 3, disposed near to the lap portion extending spirally along the outer peripheral face of the tubular body 3, can disperse a bending stress, produced upon bending of the tubular body 3, in the axial direction and the peripheral direction over the outer peripheral face to relieve this bending stress, and therefore the corrugated tube 1 can be easily bent.

Therefore, the operator can easily bend the corrugated tube 1 along the installation path though the corrugated tube has the strip-like lap portion 8, and the installation operation can be effected easily.

Figure 3:
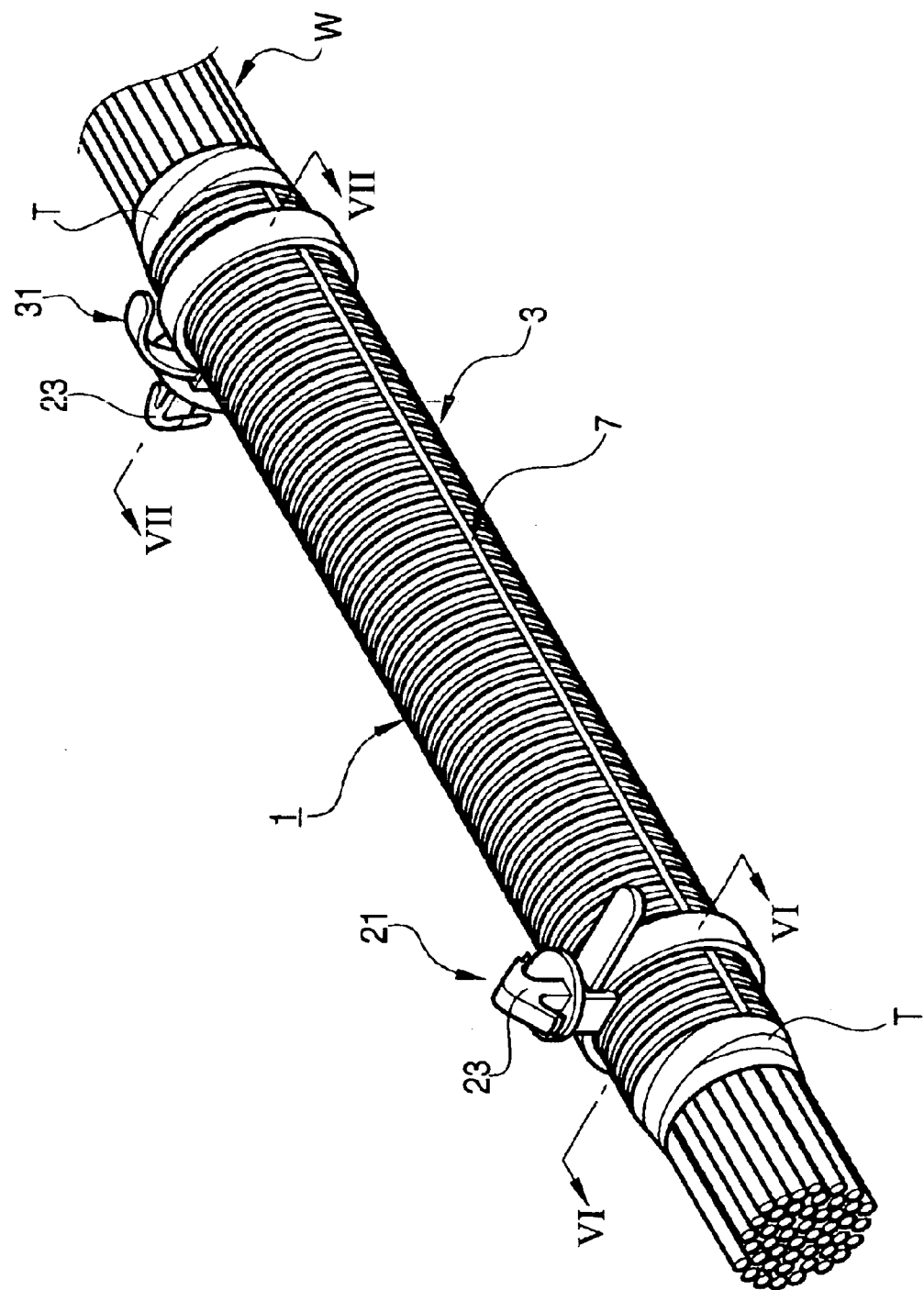
FIG. 3 is a perspective view of a corrugated tube-mounting structure according to a second embodiment of the invention, showing a corrugated tube in a straight condition before it is mounted.

A corrugated tube 1, used in a mounting structure according to a second embodiment, is fixed to a predetermined portion of a wire harness W by adhesive tapes T or the like wound respectively on opposite end portions thereof, as shown in FIG. 3.

Figure 11:
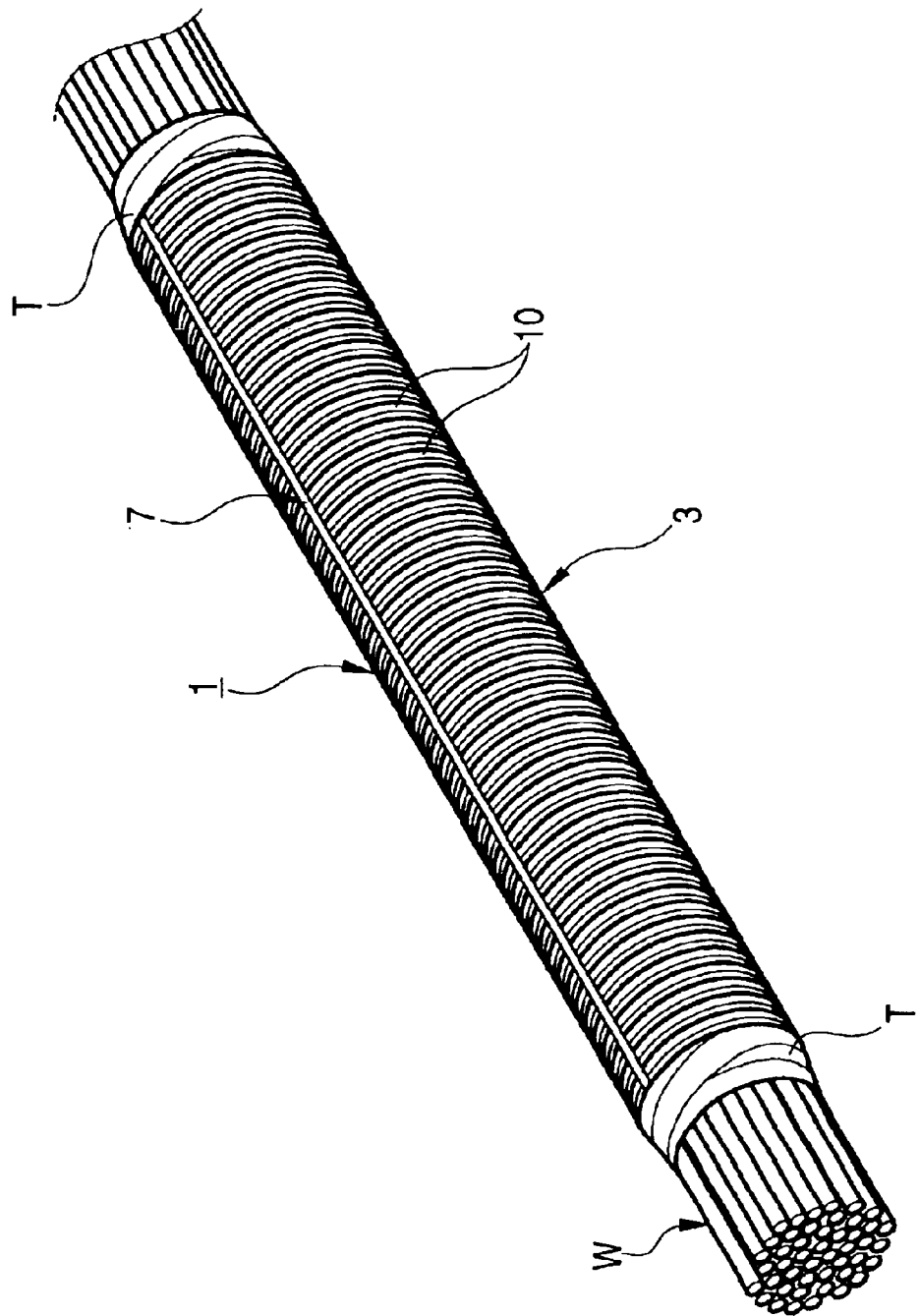
FIG. 11 is a perspective view explanatory of a related-art corrugated tube-mounting structure, showing a corrugated tube in a straight condition before it is mounted.
Figure 12:
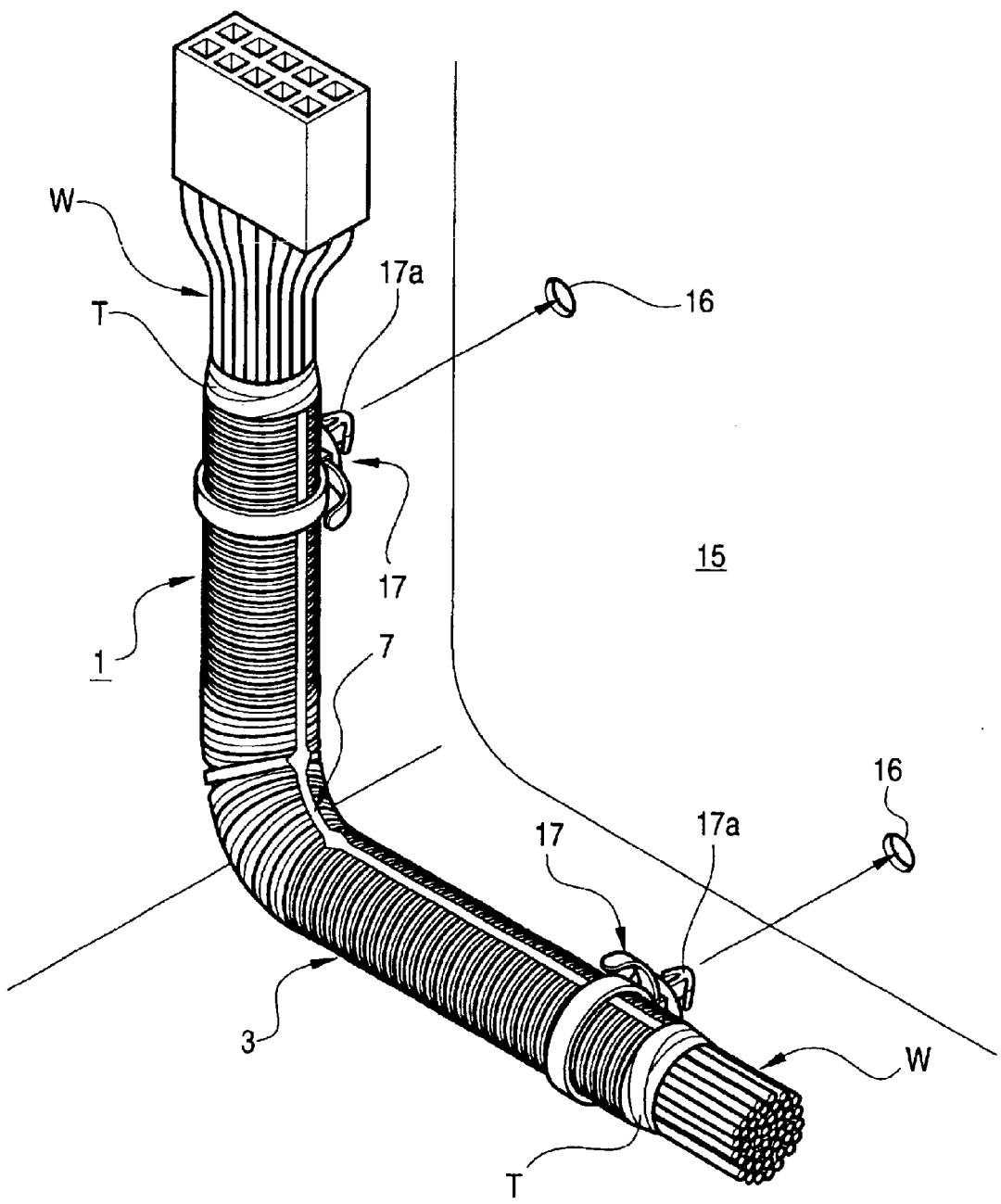
FIG. 12 is a perspective view explanatory of the related-art corrugated tube-mounting structure, showing the corrugated tube in a bent condition before it is mounted.

At this time, a tubular body 3 need only to be fixed to the wire harness W, passing therethrough, in such a manner that the opposite end portions of this tubular body 3 are fixed straight to the wire harness W as is the case with the tubular body 3 of FIG. 11, and therefore the operation for fixing the tubular body 3 to the wire harness W is easy.

Then, a pair of band clips (clamp members) 21 and 31 are fastened respectively on those portions of the outer peripheral face of the tubular body 3 disposed near respectively to the opposite ends of this tubular body 3.

Figure 4:
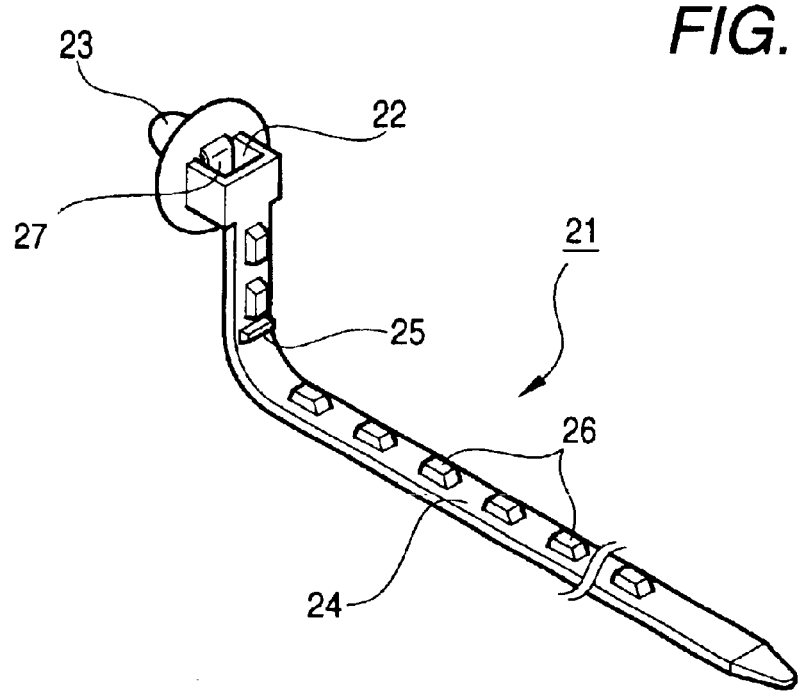
FIG. 4 is a perspective view of one band clip shown in FIG. 3.

As shown in FIG. 4, the band clip 21 is integrally molded of an insulative resin material, and includes a winding bland 24 for being wound on the outer peripheral face of the tubular body 3, a band passing/retaining portion 22, which is formed integrally at a proximal end of the winding band 24 so that a distal end portion of the winding band 24 can be passed through and retained by this band passing/retaining portion 22, and a clip portion 23 formed on and projecting from an outer face of the band passing/retaining portion 22.

Figure 6:
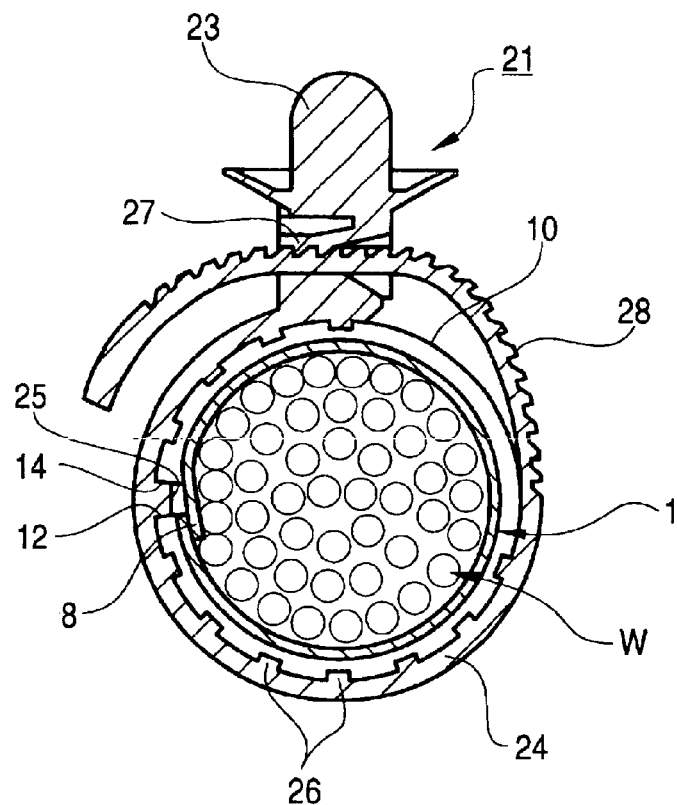
FIG. 6 is a cross-sectional view taken along the line VI—VI of FIG. 3.

A series of retaining teeth 28 like rack teeth are formed on an outer peripheral face (lower face in FIG. 4) of the winding band 24, and are arranged in a direction of the length of the winding band 24 over a predetermined range (see FIG. 6).

A retaining tongue 27 for retaining engagement with the retaining teeth 28 of the winding band 24 is formed within a passage hole in the band passing/retaining portion 22.

The retaining teeth 28 of the winding band 24 and the retaining tongue 27 of the band passing/retaining portion 22 are so designed that the movement of the winding band 24 relative to the passage hole in the band passing/retaining portion 22 in an inserting direction is allowed, while the movement of the winding band 24 relative to this passage hole in a withdrawing direction is inhibited through the retaining engagement between the retaining teeth and the retaining tongue.

A plurality of displacement stoppers 26 of a rib-like shape are formed on the inner peripheral face (upper face in FIG. 4) of the winding band 24 (which is held in contact with the outer peripheral face of the corrugated tube 1 at the time of the clamping) at predetermined intervals in the direction of the length of the winding band 24. The displacement stoppers 26 are so shaped and sized as to be retainingly engaged in any of outer peripheral grooves each formed between adjacent ridge portions 10 of the tubular body 3. These displacement stoppers 26 serve to prevent the band clip 21 from being displaced in the axial direction relative to the tubular body 3.

A rotation stopper 25 is formed on that portion of the inner peripheral face of the winding band 24 disposed near to the band passing/retaining portion 22. As shown in FIG. 6, the rotation stopper 25 is fitted in a gap between end walls 12 and 14 which are formed respectively at peripheral ends of the ridge portion 10 opposed to each other with a slit (in the tubular body 3) lying therebetween, and by doing so, the band clip 21 is prevented from being rotated in the peripheral direction relative to the tubular body 3.

As shown in FIGS. 3 and 6, the band clip 21 is fixed to the outer peripheral face of the tubular body 3 against movement relative to this tubular body 3.

Figure 5:
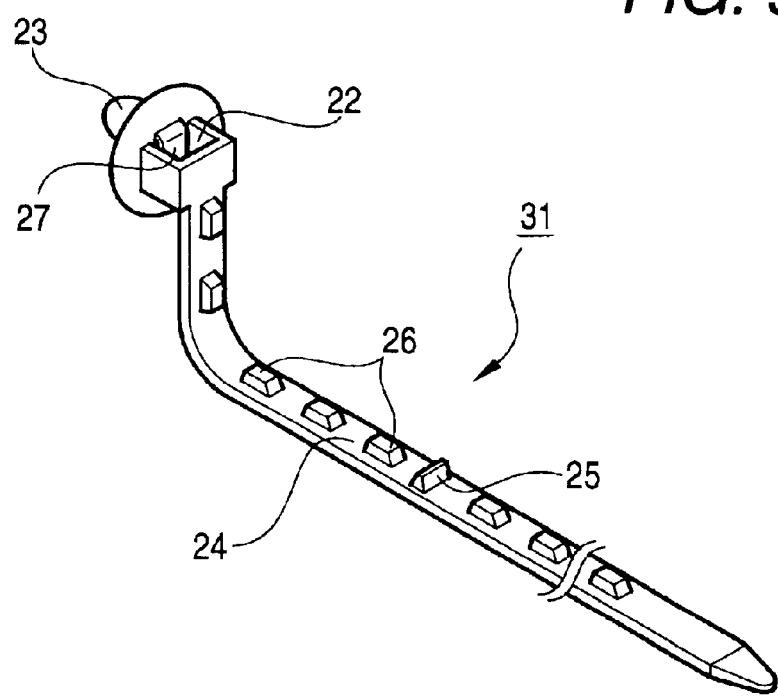
FIG. 5 is a perspective view of the other band clip shown in FIG. 3.
Figure 7:
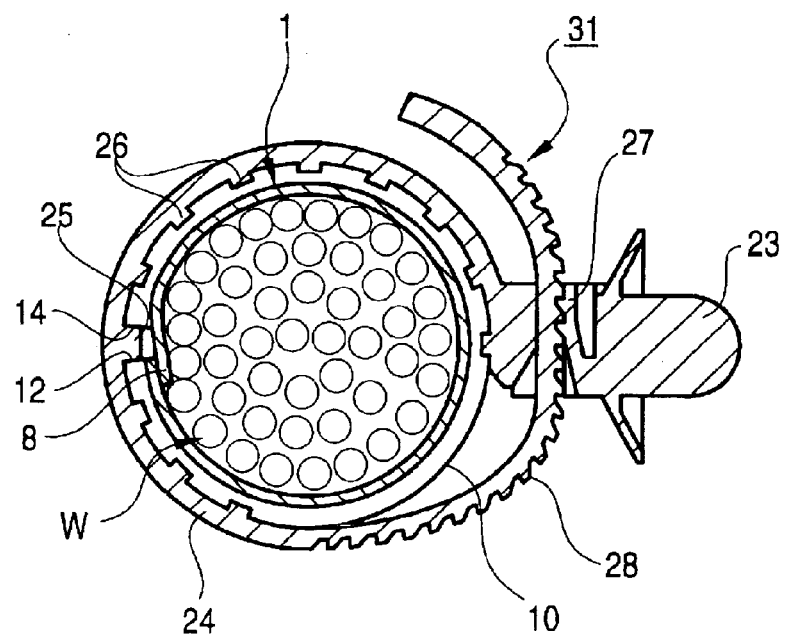
FIG. 7 is a cross-sectional view taken along the line VII—VII of FIG. 3.

As shown in FIGS. 5 and 7, the other band clip 31 is similar in construction to the band clip 21 except that the position of formation of a rotation stopper 25 on an inner peripheral face of a winding band 24 is different from that of the rotation stopper 25 of the band clip 21, and therefore detailed description of the other band clip is omitted here.

The clip portions 23 of the pair of band clips 21 and 31, fixed respectively to those portions of the tubular body 3 disposed near respectively to the opposite ends thereof, are inserted respectively into mounting holes 16 in a vehicle body panel 15, so that the corrugated tube 1, together with the wire harness W, is fixed to a predetermined portion of the vehicle body panel 15. The band clips 21 and 31 are fixed to the tubular body 3 in such a manner that their clip portions 23 face in their respective predetermined directions so that the tubular body 3, installed in a bent condition on the vehicle body panel 15, can be twisted about the axis thereof, as shown in FIG. 8.

Namely, in this second embodiment, the pair of band clips 21 and 31 are beforehand fixed to the outer peripheral face of the tubular body 3 in such a manner that their clip portions 23 are circumferentially spaced an angle of 90 degrees from each other about the axis of the tubular body 3, and face in their respective predetermined directions, as shown in FIGS. 3, 6 and 7. Here, the direction of projecting of the clip portion 23 of each of the band clips 21 and 31 is determined by the position of formation of its rotation stopper 25 fitted in the gap between the end walls 12 and 14 on the tubular body 3.

Figure 8:
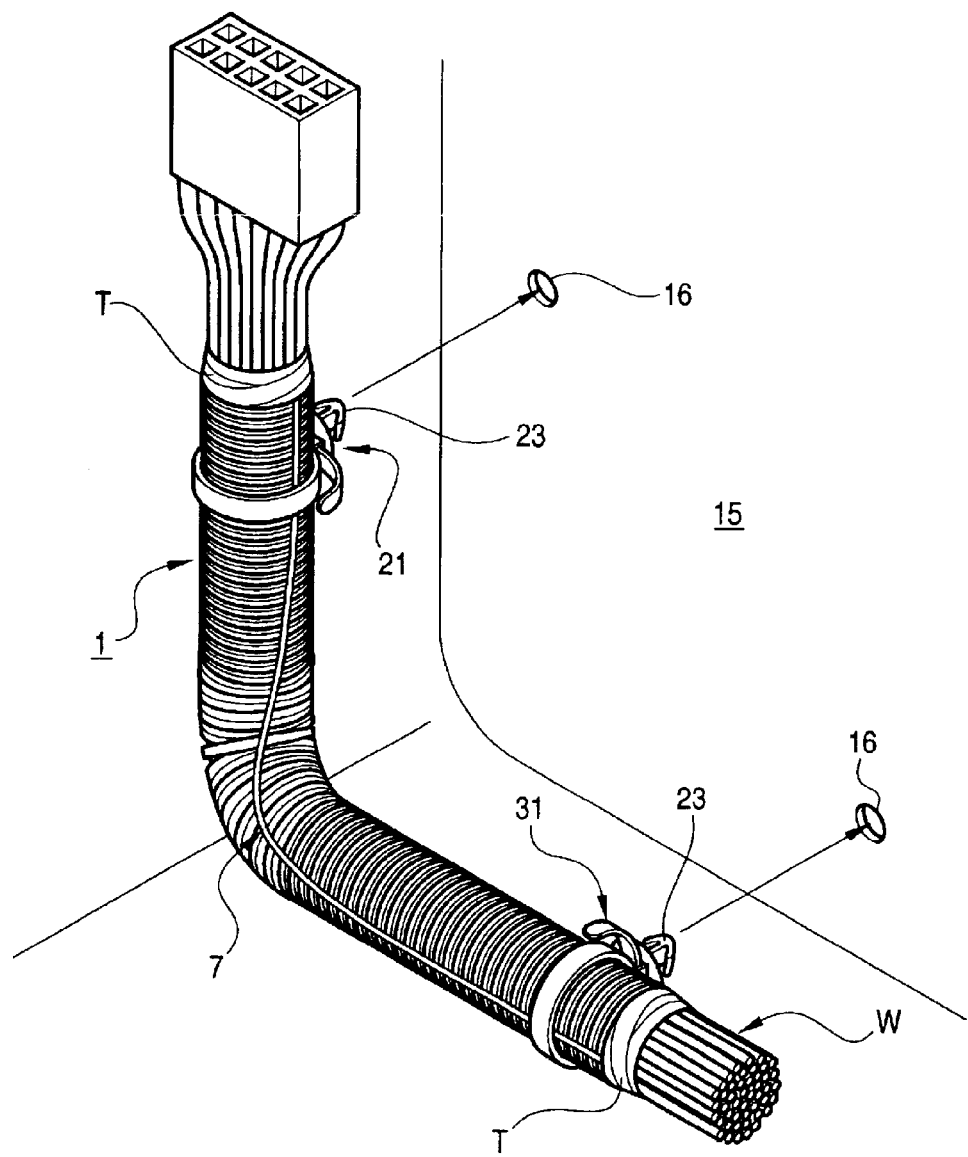
FIG. 8 is a perspective view of the corrugated tube-mounting structure of FIG. 3, showing the corrugated tube in a bent condition before it is mounted.

Therefore, when the corrugated tube 1, together with the wire harness W, is installed on and fixed to the vehicle panel 15, the clip portions 23 of the pair of band clips 21 and 31, beforehand fixed to the outer peripheral face of the tubular body 3, are fixed respectively to the predetermined portions of the vehicle body panel 15, and by doing so, the tubular body 3, installed on the vehicle body panel 15, is twisted through an angle of about 90 degrees about the axis thereof, as shown in FIG. 8.

At this time, the tubular body 3 is bent generally at right angles in accordance with the installation path of the wire harness W. However, this tubular body is installed on and fixed to the vehicle body panel 15 in such a manner that the tubular body is twisted about the axis thereof, and those portions of the tubular body 3, disposed near to a lap portion extending spirally along the outer peripheral face of the tubular body 3, can disperse a bending stress, produced upon bending of the tubular body 3, in the axial direction and the peripheral direction over the outer peripheral face to relieve this bending stress, and therefore the corrugated tube 1 can be easily bent.

Therefore, the operator can easily bend the corrugated tube 1 along the installation path though the corrugated tube has the strip-like lap portion 8, and the installation operation can be effected easily.

In the second embodiment, although the tubular body 3 is twisted about the axis thereof through the angle of about 90 degrees, this twisting angle can be suitably changed in accordance with the overall length of the tubular body 3 and so on.

Namely, the pair of band clips 21 and 31 are beforehand fixed to the outer peripheral face of the tubular body 3 in such a manner that their clip portions 23 are circumferentially spaced a desired angle from each other about the axis of the tubular body 3, and face in their respective predetermined directions, and by doing so, the angle of twisting of the tubular body 3 is determined.

In the case where the tubular body 3 has such a large overall length that the twisting angle becomes large, the number of the band clips, beforehand fixed to the outer peripheral face of the tubular body, may be increased, and in this case the tubular body 3 is twisted sequentially along the length thereof.

In the corrugated tube-mounting structures of the present invention, the constructions of the ridge portions and the lap portion, the construction of the clamp members and so on are not limited to those of the above embodiments, but can take various forms within the scope of the invention.

For example, there can be used clamp members each including a mounting portion for being fixed to the tubular body along the length thereof by an adhesive tape or the like, and a clip portion extending perpendicularly from this mounting portion.

What is claimed is:

1. A method of mounting a corrugated tube onto a panel body, comprising the steps of:

providing a corrugated tube, including:
        a tubular body, formed with a slit extending in an axial direction of the tubular body;
        a plurality of ridge portions, formed on an outer periphery of the tubular body and arranged side by side in the axial direction; and
        a lap portion, protruded from one of opposed end portions of the tubular body which are separated by the slit and extended toward an inner face of the other opposed end portion of the tubular body;

providing fixation members on the outer periphery of the tubular body;

twisting the tubular body such that the slit is spirally extended;

bending the twisted tubular body; and attaching the fixation members onto the panel body while the corrugated tube is bent.

2. The mounting method as set forth in claim 1, further comprising a step of fixing the twisted tubular body with electric wires inserted into the tubular body, before the bending step.

3. The mounting method as set forth in claim 1, wherein:

each fixation member includes a clip member fixed on the panel body;

the respective clip members are oriented to different circumferential directions with respect to the tubular body, when the fixation members are provided; and the tubular body is so twisted that the respective clip members are oriented to an identical circumferential direction.

* * * * *